United States Patent
Kymissis et al.

(10) Patent No.: US 10,041,689 B2
(45) Date of Patent: Aug. 7, 2018

(54) WIRELESS AUTOMATIC TEMPERATURE CONTROL OF RADIATOR HEATING

(75) Inventors: Ioannis Kymissis, New York, NY (US); Marshall Cox, Brooklyn, NY (US); John Sarik, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 1076 days.

(21) Appl. No.: 14/001,208

(22) PCT Filed: Feb. 24, 2012

(86) PCT No.: PCT/US2012/026608
§ 371 (c)(1),
(2), (4) Date: Jul. 16, 2014

(87) PCT Pub. No.: WO2012/116322
PCT Pub. Date: Aug. 30, 2012

(65) Prior Publication Data
US 2014/0326796 A1 Nov. 6, 2014

Related U.S. Application Data

(60) Provisional application No. 61/505,654, filed on Jul. 8, 2011, provisional application No. 61/466,261, filed
(Continued)

(51) Int. Cl.
*F24D 19/10* (2006.01)
*F24D 19/06* (2006.01)
(Continued)

(52) U.S. Cl.
CPC ..... *F24D 19/1009* (2013.01); *F24D 19/0087* (2013.01); *F24D 19/06* (2013.01);
(Continued)

(58) Field of Classification Search
CPC .. F24D 19/1009; F24D 19/0087; F24D 19/06; F24D 19/062; F24D 19/064;
(Continued)

(56) References Cited

U.S. PATENT DOCUMENTS

| 224,055 | A | * | 2/1880 | Tudor et al. | ............ | F24D 19/06 165/129 |
| 1,288,183 | A | | 12/1918 | Price | | |

(Continued)

FOREIGN PATENT DOCUMENTS

| EP | 0556168 A1 | 8/1993 |
| GB | 759049 | 10/1956 |

(Continued)

OTHER PUBLICATIONS

"International Application Serial No. PCT/US2012/026608, Search Report dated May 31, 2012", 2 pgs.
(Continued)

*Primary Examiner* — Gregory Huson
*Assistant Examiner* — Daniel E Namay
(74) *Attorney, Agent, or Firm* — Lisa A. Chiarini; Reed Smith LLP

(57) ABSTRACT

An insulated heating-unit cover having an opening to permit air to circulate around the heating-source when a vent disposed at the top of the cover is opened, allowing heat into a space. The cover can include a heating-unit temperature sensor disposed within a space covered by the cover and a controller in wireless communication with a space temperature sensor located at a distance away from the heating-unit. The controller can be configured to operate an actuator such that the vent is open when the space temperature sensor indicates that the ambient temperature is below a set point temperature and such that the vent is closed when the ambient temperature is greater than the set point tempera- (Continued)

ture. The controller can communicate with a plurality of other similar controllers and a central server to effect changes in the output of a central heating source coupled to a plurality of individual heating-units.

26 Claims, 8 Drawing Sheets

Related U.S. Application Data on Mar. 22, 2011, provisional application No. 61/446,903, filed on Feb. 25, 2011.

(51) Int. Cl.

| G05D 23/19 | (2006.01) |
|---|---|
| F24D 19/00 | (2006.01) |
| F24F 11/00 | (2018.01) |
| F24F 11/30 | (2018.01) |
| F24F 110/10 | (2018.01) |
| F24F 130/00 | (2018.01) |
| F24F 130/10 | (2018.01) |
| F24F 11/58 | (2018.01) |
| F24F 11/46 | (2018.01) |

(52) U.S. Cl.
CPC ......... *F24D 19/062* (2013.01); *F24D 19/064* (2013.01); *F24D 19/1018* (2013.01); *G05D 23/1905* (2013.01); *F24F 11/30* (2018.01); *F24F 11/46* (2018.01); *F24F 11/58* (2018.01); *F24F 2110/10* (2018.01); *F24F 2130/00* (2018.01); *F24F 2130/10* (2018.01)

(58) Field of Classification Search
CPC ............. F24D 19/1018; G05D 23/1905; F24F 11/0012; F24F 2011/0058; F24F 2011/0071; F24F 2011/0075; F24F 2110/10; F24F 2130/00; F24F 2130/10
USPC .............................................. 237/79, 71, 12
See application file for complete search history.

(56) References Cited

U.S. PATENT DOCUMENTS

| 1,782,374 | A | * | 11/1930 | Walls | F24D 19/06 |
| | | | | | 15/257.1 |
| 1,791,981 | A | * | 2/1931 | Shipp | F24D 19/0085 |
| | | | | | 165/100 |
| 1,854,578 | A | * | 4/1932 | Catto | F24D 19/06 |
| | | | | | 237/70 |
| 1,891,169 | A | * | 12/1932 | Mundorf | F24D 19/06 |
| | | | | | 165/129 |
| 2,135,461 | A | * | 11/1938 | Wooley | F28D 1/024 |
| | | | | | 165/121 |
| 2,287,045 | A | * | 6/1942 | Lilja | F24D 19/1009 |
| | | | | | 236/74 R |
| 2,318,875 | A | * | 5/1943 | McAnlis | F24D 19/1003 |
| | | | | | 200/61.7 |
| 2,500,037 | A | * | 3/1950 | Katz | F24D 19/06 |
| | | | | | 237/79 |
| 2,512,661 | A | * | 6/1950 | Marini | F24D 19/06 |
| | | | | | 237/79 |
| 2,656,780 | A | * | 10/1953 | Spieth | F24D 19/04 |
| | | | | | 165/55 |
| 2,731,242 | A | * | 1/1956 | Borg | F28D 1/0233 |
| | | | | | 165/129 |
| 2,765,120 | A | * | 10/1956 | Mascolo | F24D 19/06 |
| | | | | | 165/129 |
| 3,395,752 | A | * | 8/1968 | Fowell | F24D 19/0087 |
| | | | | | 165/122 |
| 3,865,969 | A | * | 2/1975 | Mulvey | H02G 3/128 |
| | | | | | 174/506 |
| 4,116,507 | A | * | 9/1978 | Marusiak, Jr. | A47B 81/00 |
| | | | | | 237/79 |
| 4,126,268 | A | * | 11/1978 | Vitale | F24D 19/0087 |
| | | | | | 165/122 |
| 4,403,644 | A | | 9/1983 | Hebert | |
| 4,497,438 | A | * | 2/1985 | Bonne | F23N 1/107 |
| | | | | | 236/42 |
| 4,539,942 | A | | 9/1985 | Kobayashi et al. | |
| 4,607,791 | A | * | 8/1986 | Gantner | F24D 11/003 |
| | | | | | 126/643 |
| 4,714,194 | A | * | 12/1987 | Eckman | F24H 3/0411 |
| | | | | | 165/122 |
| 4,750,546 | A | * | 6/1988 | Godbout | F24D 19/1009 |
| | | | | | 165/55 |
| 5,226,592 | A | | 7/1993 | Turner | |
| 5,228,504 | A | | 7/1993 | Mantegazza et al. | |
| 5,454,512 | A | * | 10/1995 | Berlaimont | F24D 19/06 |
| | | | | | 165/135 |
| 5,477,917 | A | | 12/1995 | Salyer | |
| 5,646,858 | A | | 7/1997 | Schrock et al. | |
| 6,142,219 | A | | 11/2000 | Korenic et al. | |
| 6,482,332 | B1 | | 11/2002 | Malach et al. | |
| 7,789,129 | B1 | | 9/2010 | Barden | |
| 7,841,389 | B1 | * | 11/2010 | Barba | F24D 19/0087 |
| | | | | | 165/122 |
| 8,347,950 | B2 | * | 1/2013 | Stroobants | F24D 19/0082 |
| | | | | | 165/181 |
| 2002/0152298 | A1 | * | 10/2002 | Kikta | H04L 12/2803 |
| | | | | | 709/223 |
| 2003/0155099 | A1 | * | 8/2003 | Montague, Jr. | F24D 19/04 |
| | | | | | 165/47 |
| 2003/0230633 | A1 | * | 12/2003 | Rixen | F23N 3/08 |
| | | | | | 237/69 |
| 2004/0123905 | A1 | | 7/2004 | Petschek | |
| 2004/0222309 | A1 | * | 11/2004 | Skertich | F24D 19/0087 |
| | | | | | 237/50 |
| 2005/0258394 | A1 | | 11/2005 | Bacher | |
| 2007/0119958 | A1 | | 5/2007 | Kates | |
| 2007/0175609 | A1 | | 8/2007 | Christ | |
| 2009/0114381 | A1 | * | 5/2009 | Stroobants | F24D 19/0082 |
| | | | | | 165/201 |
| 2009/0218087 | A1 | | 9/2009 | Oshima | |
| 2010/0045470 | A1 | | 2/2010 | Araiza et al. | |
| 2010/0236595 | A1 | | 9/2010 | Bell et al. | |
| 2011/0120040 | A1 | | 5/2011 | Alderman | |
| 2012/0227926 | A1 | | 9/2012 | Field et al. | |

FOREIGN PATENT DOCUMENTS

| WO | WO-2004003451 A1 | 7/2004 |
| WO | WO-2009133543 A1 | 11/2009 |
| WO | 2011058383 | 5/2011 |
| WO | WO-2012116322 A1 | 8/2012 |
| WO | 2012166650 | 12/2012 |

OTHER PUBLICATIONS

"International Application Serial No. PCT/US2012/026608, Written Opinion dated May 31, 2012", 9 pgs.
Farid, MM et al., "A review on phase change energy storage: materials and applications" Energy Conversion and Management, 2004, vol. 45; p. 1597-1615.
International Search report PCT/US13/63305.
European Search Report EP 12750024.
Nagano, K et al. "Study of a floor supply air conditioning using granular phase change material to augment building mass thermal storage—Heat response in small scale experiments" Energy and Buildings, 2006, vol. 38 pp. 436-446.
Communication from European Patent Office for European Application No. 12 750 024.7, dated Nov. 18, 2015, 5 pages.
Communication from the European Application No. 12750024.7 dated Jul. 13, 2016.
Communication from the European Application No. 12750024.7 dated Jul. 28, 2017.

(56) References Cited

OTHER PUBLICATIONS

International Preliminary Report on Patentability from PCT/US12/026608 dated Aug. 27, 2013.
Supplementary European Search Report from EP 13843138.2 dated Jun. 24, 2016.
Communication from the European Application No. 13843138.2 dated Nov. 20, 2017.
European Search Report from EP 12750024.7 dated Oct. 14, 2014.
International Preliminary Report on Patentability from PCT/US13/063305 dated Apr. 7, 2015.
Final Office Action Issued in U.S. Appl. No. 14/678,320 (dated Jan. 12, 2018).

* cited by examiner

WIRELESS AUTOMATIC TEMPERATURE CONTROL OF RADIATOR HEATING

CLAIM OF PRIORITY

This patent application is a U.S. National Stage Application filed under 35 U.S.C. § 371 of International Application Serial No. PCT/US2012/026608, entitled "WIRELESS AUTOMATIC TEMPERATURE CONTROL OF RADIATOR HEATING", filed on Feb. 24, 2012, and published on Aug. 30, 2012 as WO 2012/116322 A1, which claims the benefit of priority to the following U.S. Provisional Patent Applications: Ser. No. 61/446,903, entitled "VARIABLE INSULATION FOR RADIATOR HEATING CONTROL," filed on Feb. 25, 2011; Ser. No. 61/466,261, entitled "WIRELESS AUTOMATIC TEMPERATURE CONTROL FOR BUILDINGS WITH RADIATOR HEATING," filed on Mar. 22, 2011; and Ser. No. 61/505,654, entitled "WIRELESS AUTOMATIC TEMPERATURE CONTROL FOR BUILDINGS WITH RADIATOR HEATING," filed on Jul. 8, 2011, each of which is hereby incorporated by reference herein in its entirety.

BACKGROUND

Radiators for heating in homes, apartments, offices, and other multi-unit buildings suffer from a number of issues related to temperature control and energy efficiency. Particularly in large cities such as New York, steam and hot-water-heated apartment buildings are notorious for their heating issues, exemplified by open apartment windows during the winter heating season. These issues are often exacerbated by city regulations that require landlords to keep apartments at a temperature of at least 68 degrees Fahrenheit (F)/20 degrees Celsius (C), or higher. Additionally, the fact that steam and hot-water-heat heating systems provide heat to different spaces in a building with different efficiencies that are difficult to precisely control.

One approach to addressing the inconsistency in radiator heat is the use of thermostatic valves (TRVs) as an add-on to typical heating systems. TRVs can open and close a valve in response to temperature in a space. However, these devices cannot increase the heat exchange properties in a cold apartment, and need to be installed, balanced, and calibrated in each different installation location. Different equipment for different piping configurations may also be required. TRVs can also have reliability and maintenance issues, and a relatively short lifespan.

In addition to these heating issues is the energy usage in the boiler itself. Because of minimum temperature regulations boiler systems are usually run a certain percentage of the day and are keyed to keep the coldest apartment at the minimum temperature, and are conservatively run to ensure minimum temperatures. This is grossly wasteful, as the occupants of individual apartments that get overheated need to employ some strategy to keep their apartment at a comfortable temperature—the most popular method being venting the hot air outside and blatantly wasting energy.

Another approach to addressing heating inconsistencies is the use of fans to circulate air around radiators. Examples of such systems can be found in U.S. Pat. Nos. 2,489,187, 6,003,596, 6,808,018 and 7,841,389. These examples make use of fans and motors to circulate air around a radiator, effectively increasing the heat exchange properties of the radiator for an individual space. However, these devices do not deal with overheating.

OVERVIEW

A radiator fitted with an insulative cover, one or more temperature sensors, a variable air circulation system, and control system can precisely control the temperature of an individual unit in a multi-unit building. In one example, an insulative cover is installed over and around the radiator and includes a low-cost high-R material such as foil-faced bubble wrap. Variable air circulation can include active air handling by operating fans, or passive, for example by including an adjustable opening in the radiator cover. Temperature sensing can be performed using one or more sensors placed in specific locations around the unit. These locations could include the radiator, exterior windows, locations in the unit furthest from the radiator, and living or sleeping areas of a room in the unit.

The present inventors have recognized, among other things, that a problem to be solved can include retrofitting exiting unit radiators in a multi-unit building to better control the temperature of the unit and minimize wasted energy and reduce cost. In an example, the present subject matter can provide a solution to this problem, such as by providing an insulative cover, one or more temperature sensors, a variable air circulation system, and control system to precisely control the temperature of a unit while monitoring multiple units with a centralized server configured to coordinate the operating of a heat source common to the multiple units.

In an example a system can lower heating costs for a multi-unit building without the need to be installed into an existing piping system. An example can also allow wireless communication linking multiple units and whole building feedback to a central location.

An example can provide set point control for both heating and passive cooling of individual units in a building to provide energy savings for building owner or operator by minimizing waste from overheating. An example can be configured for low or zero-power systems that include memory-shape materials or a thermo-electric generator to operate the system.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
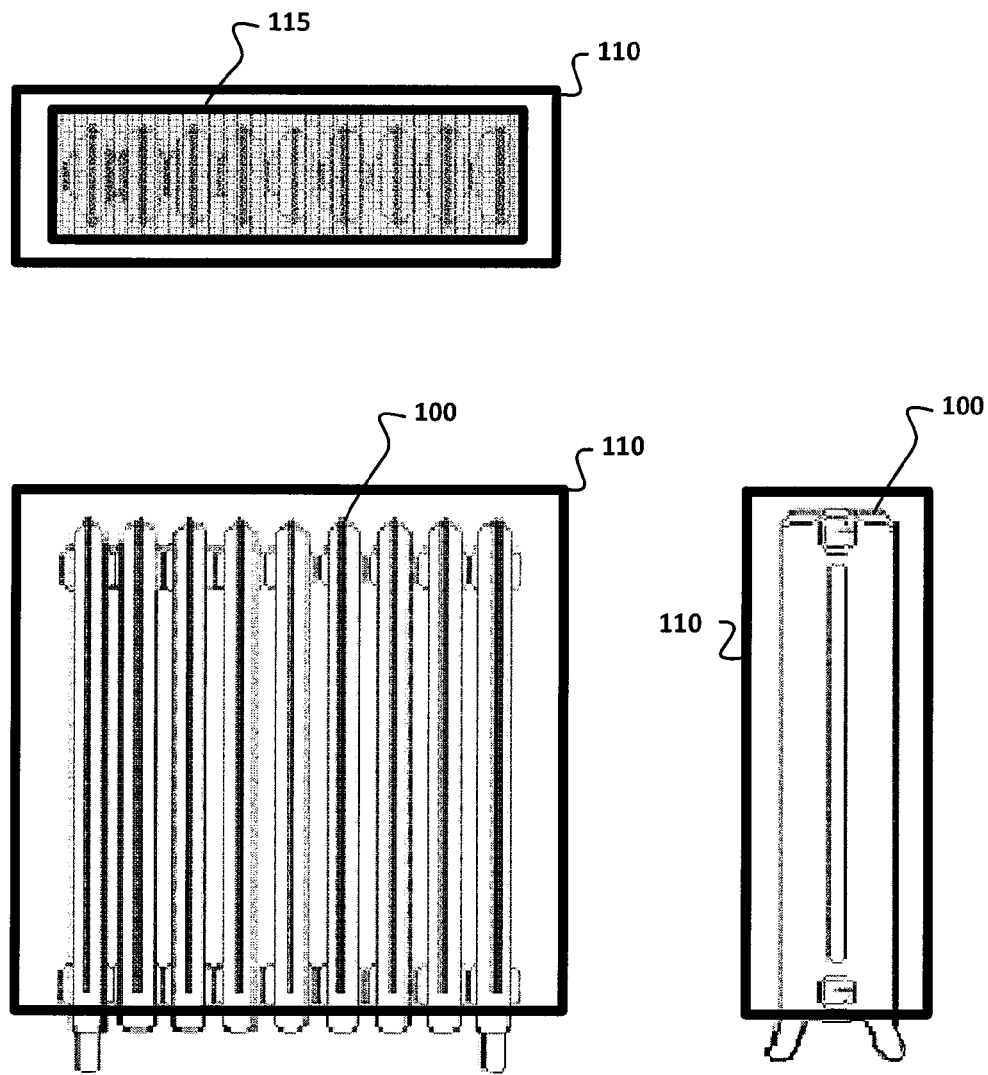
FIG. 1A is a diagram illustrating an example of a radiator surrounded by an exemplary insulating cover.

FIG. 1 is a diagram illustrating an example of a radiator surrounded by an exemplary insulating cover. In an example, a radiator 100 covered with an intelligent variable insulating cover 110 can reduce problems associated with space overheating and variable space heating disparities of multi-space heating systems. In an example, an insulating cover 110 including a low-cost high thermal resistance (R-value) material, for example a foil-faced bubble wrap, is positioned over and around the radiator 100. Because convection requires vertical venting, as long as there is no opening near the top of this enclosure there does not need to be insulation covering the bottom of the radiator 100 to insulate the space where the radiator 100 is located.

Figure 1B:
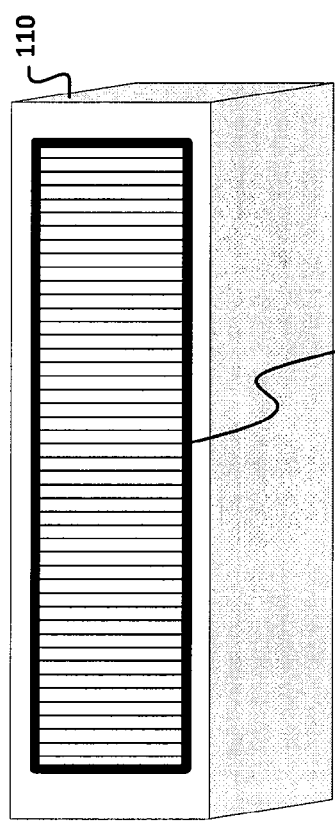
FIG. 1B is a block diagram illustrating an example of an insulating cover in an open heating configuration.
Figure 1C:
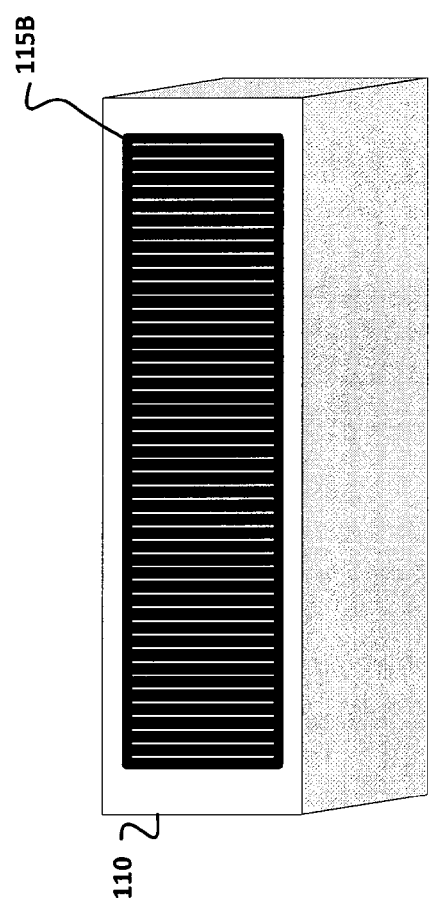
FIG. 1C is a block diagram illustrating an example of an insulating cover in a closed insulating configuration.

A vent 115 can be positioned at the top of the intelligent variable insulating cover 110 to heat the surrounding space when needed. To get hot air out of the cover 110, the vent 115A is opened, thereby connected from the top of the inside of the cover 110 to an intake near the bottom of the radiator 100. FIG. 1B is a block diagram illustrating an example of an insulating cover in an open heating configuration. On its own, this cover 110 with the vent 115B closed is still insulating, as there is still no opening near the top and thus no convection. FIG. 1C is a block diagram illustrating an example of an insulating cover in a closed insulating configuration.

In an example, the radiator cover 110 can include a passive louver that can operate as a mechanical temperature control without the need for an electronic actuator. In this example, the system can operate such that the temperature from the radiator can result in a vent in the radiator cover 110 can opening or closing automatically in response to the temperature of the room. In an example, the radiator cover 110 can include using a shape-memory component that, at the set point temperature, can seal the enclosure, and below that set point temperature can relax to allow convection of warm air from the radiator into a room. The shape-memory component can be any of a variety of shape-memory alloys, for example copper-zinc-aluminium-nickel, copper-aluminium-nickel, or nickel-titanium (NiTi) alloys can included to actuate a vent in the radiator cover 110.

In an example, one or more fans can be included in the vent 115 which, when on, draw air from the top of the cover 110 and force it into the space. This air is replaced by cold air near the floor opening at the base of the radiator 100. Once a desired minimum temperature in the space is reached the fans can be slowed or stopped. When a maximum temperature in the space is reach the vent 115 can be closed to prevent further heating of the space.

Figure 2:
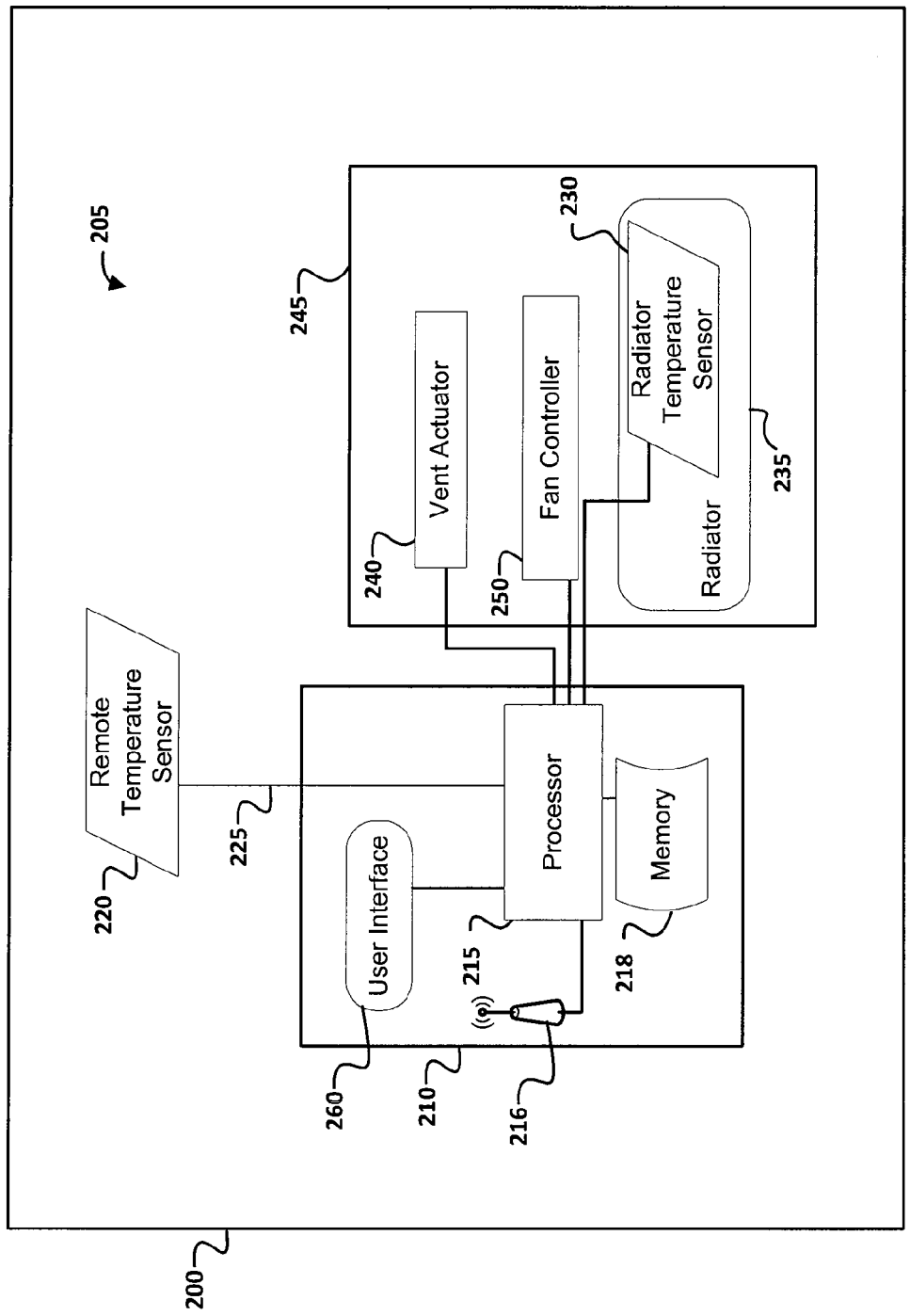
FIG. 2 is a block diagram illustrating an example of a space with an exemplary intelligent variable insulating cover system.

FIG. 2 is a block diagram illustrating an example of a space 200 with an exemplary intelligent variable insulating cover system 205. An intelligent variable insulating cover 205 can include and be controlled with a low-cost controller 210. The controller can include a processor 215 coupled to a wired or wireless network interface 216 and a tangible computer-readable memory 218. One or more remote temperature sensors 220 can be connected to the controller 210 and constantly or periodically monitored to provide the controller with the temperature of the space 200. Each remote temperature sensor 220 can be coupled to the controller with a wireless or wired interface 225. At least one remote temperature sensor 220 can be placed at a position away from radiator 235, thereby providing an accurate measure of the temperature in space 100. At least one sensor 230, for example a thermistor, can monitor the temperature of a radiator 235 in the space 200.

Variable air circulation can be active, using fans, or passive, using an adjustable opening in the vent. Temperature sensing can be done using one or more sensors place in specific locations around the space 200, which can be for example an apartment in a multi-unit building. These locations could include the radiator 235, exterior windows, locations in the space 200 furthest from the radiator, or a living or sleeping areas of the space 200.

In operation, if the room is cold, as indicated by sensor 220, and the radiator 235 is hot, as indicated by sensor 230, the microprocessor 215 can control a vent actuator 240 in a radiator cover 245 such that a vent is opened allowing cold air to enter the bottom of the radiator cover 245 and warm air to exit through a vent in the radiator cover 245. In an example, a radiator cover 245 can operate a fan controller 250 to drive fans that can push warm air into the space 200. In this mode, the radiator cover 245 can be designed to provide more heating than a stand-alone radiator, and multiple fans or fan speeds can allow variable heating power. If the room is hot, as indicated by sensor 220, the microprocessor 215 does not drive the fans, and the radiator 235 is insulated beneath the cover 245 allowing the space 200 to cool down. The microprocessor 215 can control a vent actuator 240 in a radiator cover 245 such that a vent is closed, preventing the convection of warm air from around the radiator 235 into the space 200.

The microprocessor 215 can be configured different heating rules to maximize temperature control, including individual set points for opening or closing a vent in radiator cover 245, and individual set points for starting and stopping one or more fans. The controller 210 can include a user interface 260, for example similar to that of a typical programmable thermostat, which can allow an individual in the space 200 to set a desired temperature or to adjust individual set points related to vent or fan operation. In an example the controller 210 can be integrated into the radiator cover 245 and the user interface 260 can be combined with a remote temperature sensor 220 that are wirelessly linked to the controller 210.

In an example, intelligent variable insulating cover system 205 can both log data to a memory 218, or transmit temperature and system data wirelessly to a centralized server. This data can provide inputs that can be used for building optimization, as well as feedback for efficient heat source (e.g., boiler) operation.

In an example the controller 210 can be powered using a thermoelectric generator, or an array of thermocouples that generate a voltage in response to heat energy, placed on the radiator 235. A rechargeable battery, supplied by the thermoelectric generator, can be used to store electric energy to allow the controller 210 to operate during periods when the radiator is not heated. The microprocessor can be configured to only turn on periodically after enough energy was harvested, to minimize power consumptions, or if interrupted out of a sleep state by a user input. The controller 210 can operate an infinitely variable adjustable vent on the radiator cover 245, and when on the controller 210 is operating it would read the temperature sensors, transmit and receive any necessary information, adjust the vent opening if necessary, and power down into a sleep state for a period of time.

In an example, a zero-power smart heat control system can include an electromechanical louver in a radiator cover that can be coupled with thermoelectric power harvesting. A zero-power system can operate much like the preceding embodiments described above, but in which an electrical signal can control the adjustable seal on the enclosure. For example, a thermo-electric generator on the radiator can generates electricity and can be stored in a battery or other electrical storage device. When heat is called for in the space an electromechanical louver is opened. When heat is not called for the electromechanical louver can close.

Figure 3:
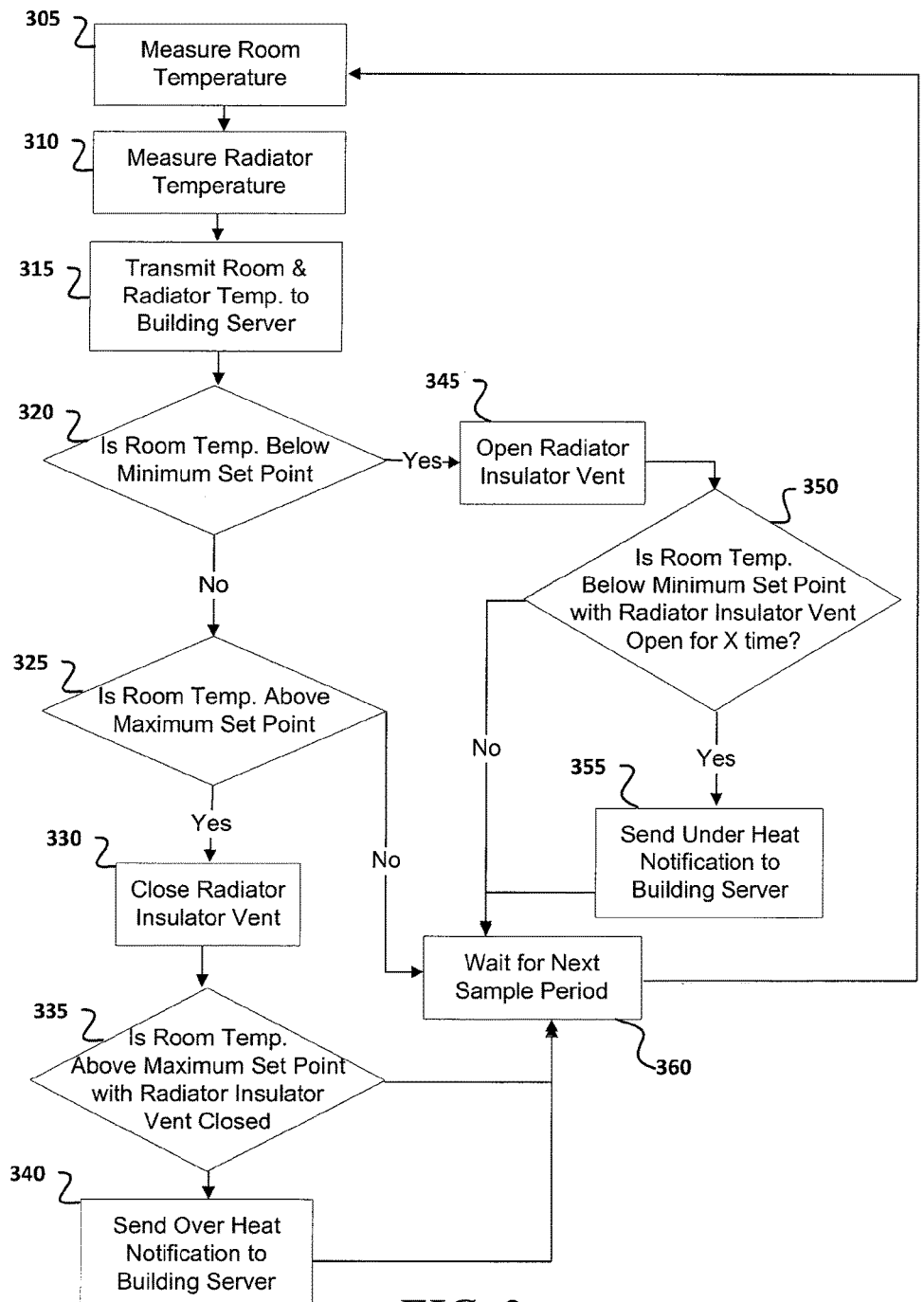
FIG. 3 is a flow diagram illustrating an example of operating a vented insulating cover.

FIG. 3 is a flow diagram illustrating an example of operating a vented insulating cover. At 305 a controller can measure the temperature in a space or room. At 310 a controller can measure the temperature of a radiator located in the space or room. At 315 the controller can wirelessly transmit the room and radiator temperature to a remote server that is responsible for aggregating all of the data for an individual building. The server can be located in the building or at a remote location such as a data center, or as part of a cloud-based Internet service. At 320 the controller can check if the room or space temperature is below a minimum set point temperature. If the room is not below the minimum set point temperature, at 325 the controller can check if the room temperature is above a maximum set point temperature. In an example the minimum set point temperature and the maximum set point temperature can be calculated from hysteresis information and a single desired room temperature.

If, at 325 the room temperature is above the maximum set point, then at 330 the system can close a vent in the insulating radiator cover, thereby preventing additional heat from entering the space. At 335 the controller can check if the room has been above a maximum set point temperature for a period of time with the vent closed. A long period of time with the vent closed and the room above the maximum set point temperature can indicate that the heat source supplying the radiator in the room is too hot or that environmental conditions have eliminated the need for heating. At 340 the controller can transmit an over-heat notification to a building server indicating that additional heating is not currently needed in the space. At 360 the system can wait for a preset period of time before repeating the temperature sampling process or sending additional notifications.

If, at 320 if the room temperature is below a minimum set point, at 345 the controller can open the vent above the radiator, thereby allowing warm air to circulate around the radiator and warm the room. At 350 the controller can check if the room has been below the minimum set point temperature with the radiator vent in the open position for a predetermined period of time. The period of time can be configure to be a long time to allow heat from a radiator to circulate through the room. If, at 350 the controller determines that the temperature in the room has stayed below the minimum set point temperature for the predetermined period of time an under heat notification can be set to a building server indicating that additional heating capacity is needed in the room. An under heat notification can also serve as a possible indicator to a building manager that an occupant of the room or space may have left a window open, allowing heat to escape into the outside atmosphere, and preventing the radiator from being able to effectively raise the temperature in the room or space above the minimum set point temperature. If the controller determines that no action should be take, at 360 it can wait for the next time period to reevaluate the temperature conditions in the room or space.

Figure 4:
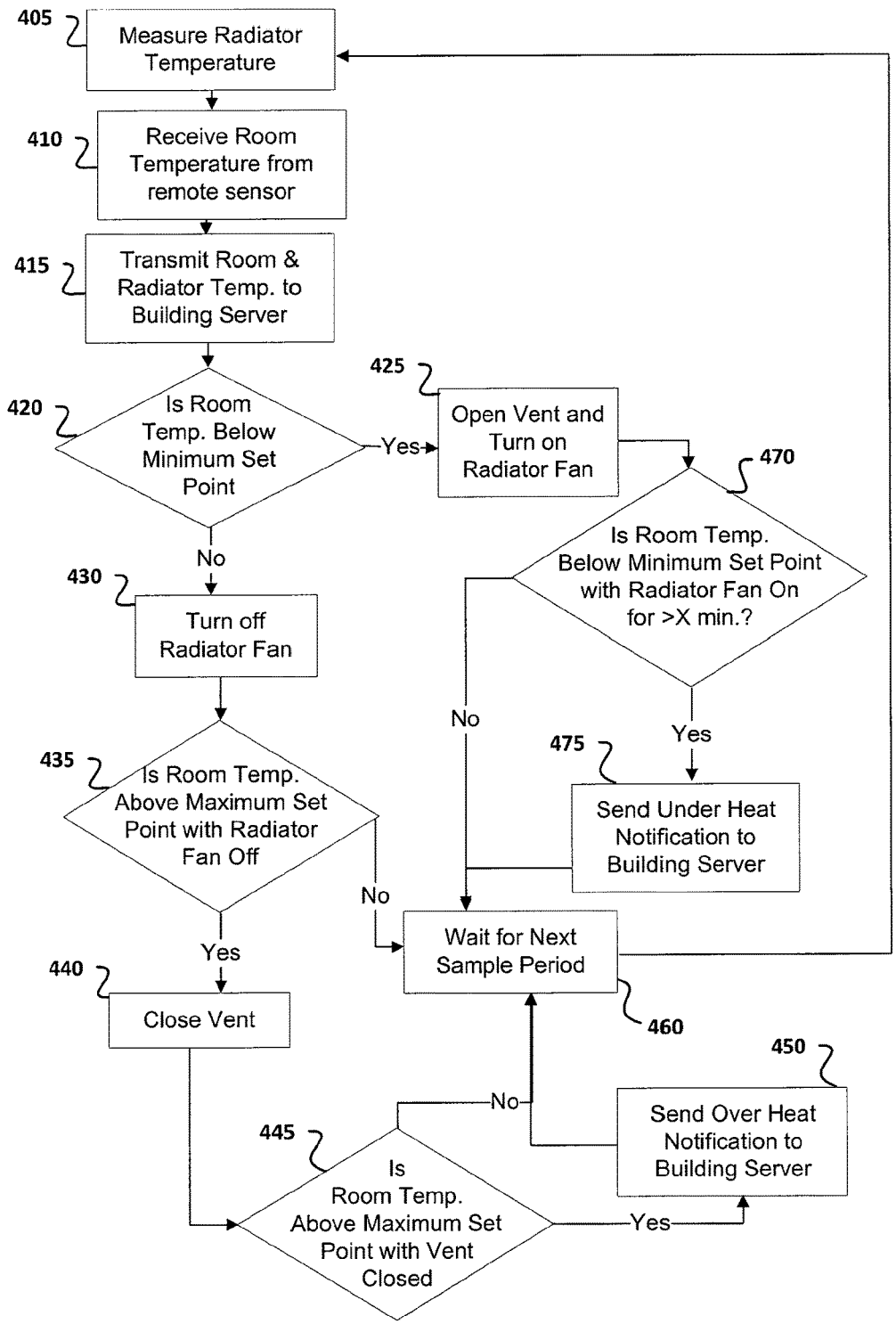
FIG. 4 is a flow diagram illustrating an example of operating an insulating cover equipped with a fan.

FIG. 4 is a flow diagram illustrating an example of operating an insulating cover equipped with a fan. At 405 a controller can measure the temperature of a radiator located in the space or room. At 410 a controller can measure the temperature in a space or room. At 415 the controller can wirelessly transmit the room and radiator temperature to a remote server that is responsible for aggregating all of the data for an individual building. The server can be located in the building or at a remote location such as a data center, or as part of a cloud-based Internet service. At 420 the controller can check if the room or space temperature is below a minimum set point temperature. If the room is below the minimum set point temperature, at 425 the controller can open a vent in the radiator cover and turn on one or more fans to increase air flow over the surface of the radiator to deliver heat into the space.

If the room is above the minimum set point temperature, at 430 the controller can open turn off the one or more fans to decrease air flow over the surface of the radiator to deliver heat into the space. The vent can be left open to allow some convection air flow around the radiator. At 435 the controller can check if the room temperature is above a maximum temperature set point with the one or more fans not being in operation. At 440 the controller can close the vent in the insulating radiator cover if the temperature in the room exceeds the maximum temperature set point. By closing the vent the radiator is fully insulated from the room or space.

At 445 the controller can check if the room or space has continued to remain above a maximum set point temperature with both the fans off and the vent closed for a preset period of time. If the preset period of time has not been reached, at 460 the controller can wait for a period of time to elapse and again measure the temperature of the room and radiator. If the preset period of time has elapsed, at 450 the controller can send an over-heat notification to a server communicatively coupled to the controller. Once a notification is sent to the server the controller can maintain an internal state or flag indicated that the server has been notified of the over-heat condition.

At 470 the controller can check if the room temperature has remained below the minimum set point temperature for an extended period of time with both the vent open and the one or more fans in operation, If the extended period of time has elapsed in this condition the controller can send an under-heat notification to the building server. If the period of time has not elapsed, at 460 the controller can wait for the next sample period.

Figure 5:
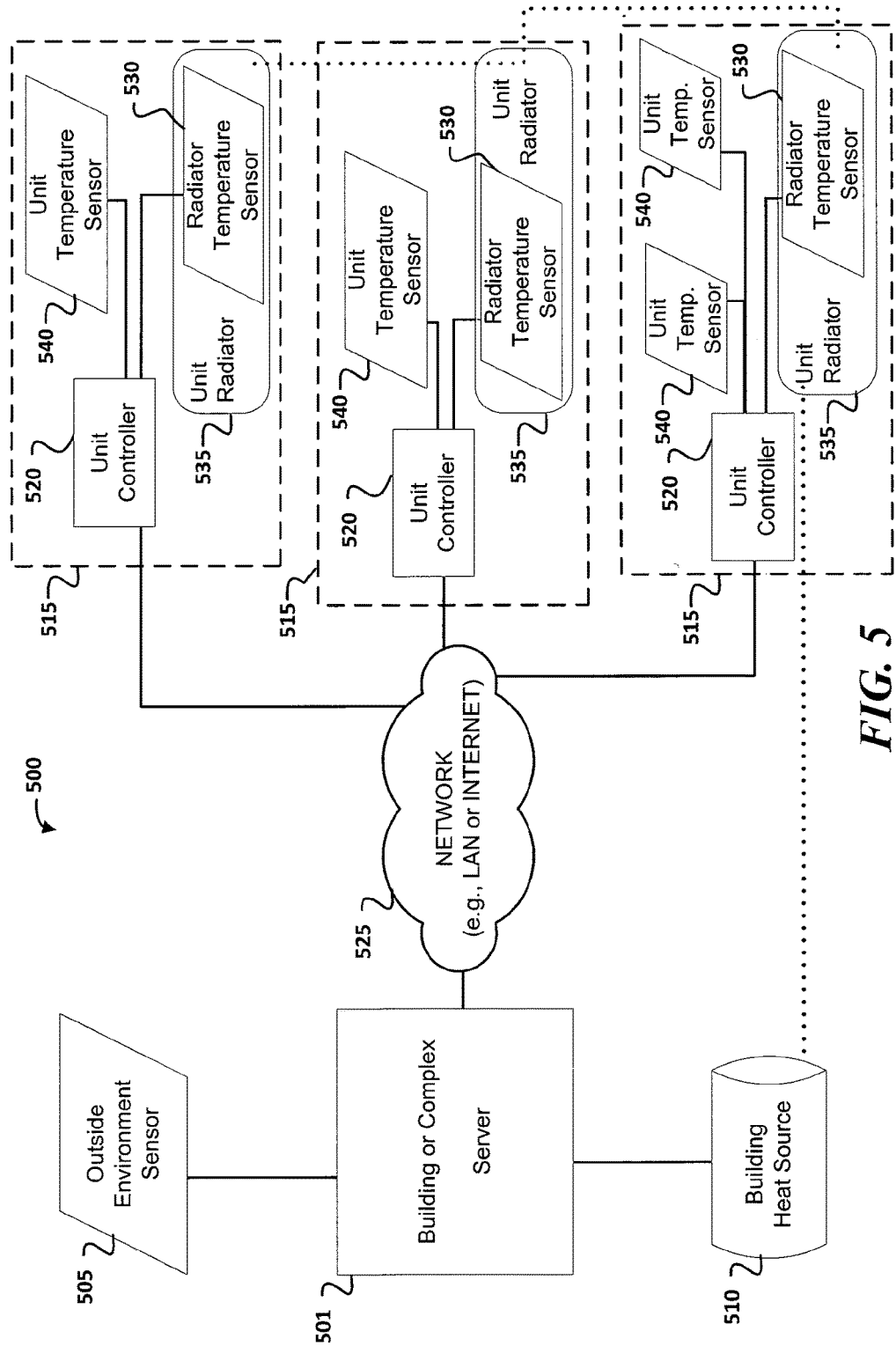
FIG. 5 is a block diagram illustrating an example of a building heating system including an exemplary heat control system.

FIG. 5 is a block diagram illustrating an example of a building heating system including an exemplary heat control system 500. A heat control system can include a server 501 allocated to a building or complex of individual buildings. The server 501 can be coupled to a weather station or other outside environment sensor 505 that can include a temperature sensor. The server 501 can also be coupled to a building heat source 510. The building heat source 510 can include a boiler, furnace, heat pump, or other equipment that can supply heat by pumping hot water or steam to individual radiators or heating units in a plurality of spaces 515.

Each space 515 can be equipped with a unit controller 520 that is communicatively coupled to the server 501 through a network 525. The network 525 can be configured in a wired, wireless, or mesh configuration. For example, in a wireless mesh network configuration each unit controller 520 can include a wireless transceiver configured to communicate with either or both the server 501 and other unit controllers 520. Each unit controller 520 processes the temperature data and determines how to adjust the variable air circulation in a respective space 515. One or more remote temperature sensors 540 can be connected to the unit controller 520 and constantly or periodically monitored to provide the unit controller 520 with the temperature of the space 515. Each remote temperature sensor 540 can be coupled to the controller with a wireless or wired interface. A temperature sensor 530 can be coupled to one or more radiator units 535 in each space 515. At least one remote temperature sensor 540 can be placed at a position away from the one or more radiators 535.

Each unit controller 520 can communicate with another unit controller 520 in a mesh network to share temperature information. This communicated information can also be logged on a central logging system on the server 501. The server 501 can be installed in a common space in a building containing each space 515 or in an off-site location. The shared and logged information can be used to monitor and diagnose the health or efficiency of the building's heating system. Specific heating and cooling algorithms can be developed for each apartment to define comfortable minimum and maximum temperature set points based on the individual heating characteristics of each space 515.

Figure 6:
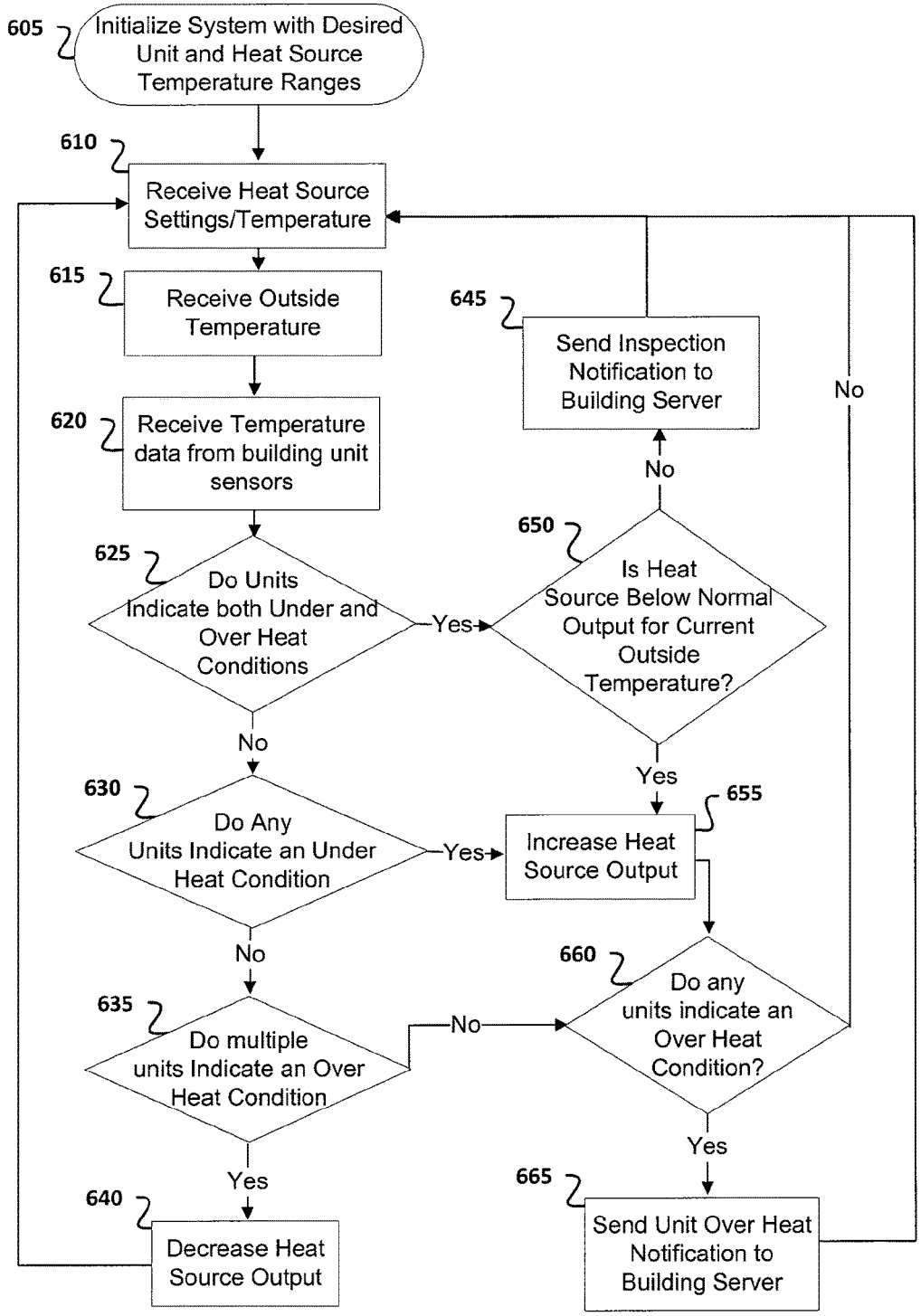
FIG. 6 is a flow diagram illustrating an example of operating a heat source in response to a plurality of unit sensors.

FIG. 6 is a flow diagram illustrating an example of operating a heat source in response to a plurality of unit sensors. At 605 a system can be configured with information including the desired minimum or maximum temperature of each unit in a building where the system is installed, along with the operating characteristics (e.g., heat source type, desire operating goals, heating hysteresis data, etc.) of the heat source. At 605 the system can receive settings and operating temperature data from the heat source. At 615 the system can receive outdoor ambient temperature information. This information can be utilized to tune or coordinate the operation of the heat source in response to changes in weather conditions. For example, on an extremely cold winter day the system can automatically operate the heat source at a higher temperature in anticipation of greater heating needs for individual units in the building. Additionally, during an unseasonably warm day the heating source can be operated at a lower temperature, or turned off altogether, thereby saving energy and expense on days when heat is not required in the building.

At 620 the system can receive temperature and set point data from individual sensors or control units in the building that correspond to specific rooms or spaces in the building. At 625 the system can check to determine if individual control units are reporting under and over heat conditions. A combination of under and over heat conditions can be caused by a variety of factors including differences in the insulation quality of separate units, an occupant leaving a window or door open during the winter, or occupants requesting temperatures for individual spaces at temperatures that are higher or lower than normal. If at 625 the system determines that under and over heat conditions are not both simultaneously present in the building, at 630 the system can check if any units are indicating an under-heat condition. If no units are reporting an under heat condition, at 635 the system can check for multiple over-heat conditions. If no over-heat conditions and no under-heat conditions are reported, at 640 the system can decrease the output of the heat source by an incremental amount in order to conserve energy and continue monitoring the building.

If at 625 the system detects both under-heat and over-heat conditions, at 650 the system can further check if the heat source is operating blow the normal output based on the current outside temperature. This check can help the system to determine if conditions in the building require investigation or if the output of the heat source should be increased. At 645 the system can log an inspection notification at the building server to indicate to a building manager or other operator that the while the system is operating within an expected range one or more individual units are experiencing an over-heat and under-heat conditions that should be investigated (e.g., for open windows). At 655 the system can increase the output of the heat source for the building if either the system is operating below normal operating conditions for a measured outside temperature or if individual units are providing under-heat condition notification in the absence of any over-heat notifications.

At 660 the system can check for individual units that are reporting an over-heat condition. If only one unit is reporting an over-heat condition the system at 665 can send a unit-over-heat notification to the building server. An individual unit-over-heat condition can be indicative of a failure in a vent actuator to properly insulate a radiator from a space, or another equipment failure that may require maintenance. By notifying a building manager, or other responsible individual, of hot spots in the building that may require adjustment the amount of heat energy being wasted can reduced if appropriate action is taken to diagnose the root cause of the failure or system problem.

As an example of the efficacy of the system as a whole, one apartment in a building may be chronically below the average temperature of the apartments in a building. This could be the result of a combination of factors—one in particular is that it is located at the end of a heating line, where the heat from the heat source has to flow through many apartments before reaching the cold apartment. As this heat travels through the line the apartments before the cold one gets heated unnecessarily, leaving less heat for the cold apartment and overheating the apartments that do not require additional heat. With a building heat control system in place, the system would identify a cold apartment wirelessly and activate the system to heat the space without overheating other spaces. Furthermore, the insulative covers over radiators in warm apartments can limit the heat transfer to rooms that do not need additional heat, eliminating overheating and increasing the heat transfer to rooms that are cold. The total efficiency gain from these two systems in conjunction is greater than the sum of its parts as it improves both heating efficiency and reduces waste heat.

In an example, the present subject matter can include system tools that can provide more information, such as user preferences, user override control, or tools to adjust or optimize one or more control algorithms or techniques that can improve energy efficiency or comfort to the occupant(s) of a space. In an example, integration of a space's unit controller with one or more smart services can help provide tighter integration with residents (e.g., other building residents) and other systems. This can provide the ability for the unit controller operating a radiator insulating system and a mesh network to communicate with smart services (e.g., smart phones, home automation systems, alarm systems, personal computer systems). This can allow the unit controller to receive additional information regarding heat requirements for a space. For example, if the resident of a space is not home or is coming home in one hour the heating control can be adjusted accordingly. This can result in further energy savings based on space occupancy.

In an example a unit controller for a space can be coupled to sensors including, but not limited to, motion sensors, occupancy sensors, window/door sensors, temperature sensors, humidity sensors, and the like. The output any one or a combination of these sensors can be provided to a microprocessor in the controller unit. For example, a window or door sensor can indicate to the controller unit that an occupant of the space has opened the space for a period of time where external unheated air can enter the space. An open window sensor signal can indicate to the controller unit that heat should not be provided to the space unless the temperature in the space drops below a critical level (e.g. 45 degrees F.). If a window is left open and the temperature in the space drops below the critical level heat can be provided to the space to attempt to prevent freezing in the space, and an alarm can be generated to the user or to a building manager indicating that the window should be closed to prevent further heat loss.

Figure 7:
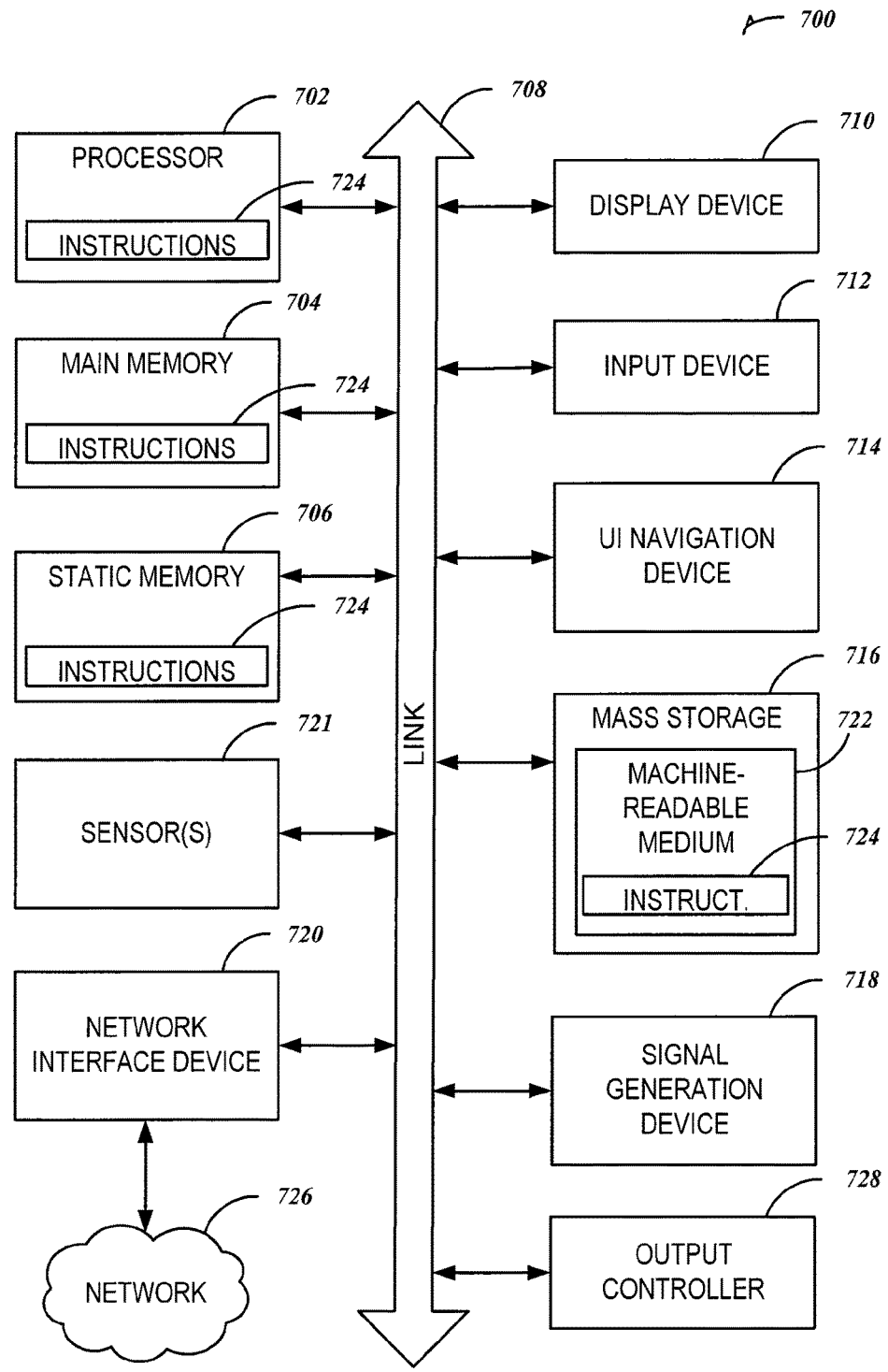
FIG. 7 is a block diagram illustrating an example machine upon which one or more embodiments may be implemented.

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a processing unit, a graphics processing unit (GPU), a hardware processor core, or any combination thereof), a main memory 704, and a static memory 706, some or all of which may communicate with each other via a link 708 (e.g., a bus, link, interconnect, or the like). The machine 700 may further include a display device 710, an input device 712 (e.g., a keyboard), and a user interface (UI) navigation device 714 (e.g., a mouse). In an example, the display device 710, input device 712, and UI navigation device 714 may be a touch screen display. The machine 700 may additionally include a mass storage (e.g., drive unit) 716, a signal generation device 718 (e.g., a speaker), a network interface device 720, and one or more sensors 721, such as a global positioning system (GPS) sensor, camera, video recorder, compass, accelerometer, or other sensor. The machine 700 may include an output controller 728, such as a serial (e.g., universal serial bus (USB), parallel, or other wired or wireless (e.g., infrared (IR)) connection to communicate or control one or more peripheral devices (e.g., a printer, card reader, etc.).

The mass storage 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the mass storage 716 may constitute machine readable media.

While the machine-readable medium 722 is illustrated as a single medium, the term "machine readable medium" may include a single medium or multiple media (e.g., a centralized or distributed database, and/or associated caches and servers) that configured to store the one or more instructions 724.

The term "machine-readable medium" may include any tangible medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

VARIOUS NOTES & EXAMPLES

Example 1 can include subject matter (such as an apparatus, a method, a means for performing acts, or a machine readable medium including instructions that, when performed by the machine, that can cause the machine to perform acts), such as can include a temperature control apparatus comprising: a cover, including an insulating material, sized to cover and surround a radiator; an adjustable vent disposed at a top portion of the cover; an actuator configured to adjust the vent between an open position and a closed position; a radiator temperature sensor disposed within a space covered by the radiator cover; a space temperature sensor disposed outside the space covered by radiator cover, the space temperature sensor configured to measure an ambient temperature; and a controller coupled to the actuator, in communication with the radiator temperature sensor and with the space temperature sensor, the controller being configured to operate the actuator such that the vent is open when the space temperature sensor indicates that the ambient temperature is below a set point temperature and the radiator temperature sensor indicates that the radiator is warmer than the ambient temperature; wherein the controller is configured to operate the actuator such that the vent is closed when the ambient temperature is greater than the set point temperature.

Example 2 can include, or can optionally be combined with the subject matter of Example 1, to optionally include the cover comprising a foil-faced bubble wrap.

Example 3 can include, or can optionally be combined with the subject matter of one or any combination of Examples 1 or 2 to optionally include the controller comprising a wireless network interface.

Example 4 can include, or can optionally be combined with the subject matter of one or any combination of Examples 1, 2 or 3 to optionally include wherein the controller and the space temperature sensor are coupled via the wireless network interface.

Example 5 can include, or can optionally be combined with the subject matter of one or any combination of Examples 1, 2, 3 or 4 to optionally include wherein the controller is coupled to a mesh network including a plurality of separate controllers via the wireless network interface.

Example 6 can include, or can optionally be combined with the subject matter of one or any combination of Examples 1, 2, 3, 4 or 5 to optionally include wherein the controller is coupled to a remote server via the wireless network interface; and configured to transmit temperature information to the remote server.

Example 7 can include, or can optionally be combined with the subject matter of one or any combination of Examples 1, 2, 3, 4, 5 or 6 to optionally include wherein the controller is configured to transmit alarm notification to the remote server when the vent is open and the ambient temperature remains below the set point temperature for a preconfigured period of time.

Example 8 can include, or can optionally be combined with the subject matter of one or any combination of Examples 1, 2, 3, 4, 5, 6 or 7 to optionally include a thermo-electric generator configured to power the controller.

Example 9 can include, or can optionally be combined with the subject matter of one or any combination of Examples 1, 2, 3, 4, 5, 6, 7 or 8 to optionally include a thermo-electric generator configured to power the actuator.

Example 10 can include, or can optionally be combined with the subject matter of one or any combination of Examples 1, 2, 3, 4, 5, 6, 7, 8 or 9 to optionally include a fan coupled to the controller such that the controller can selectively activate the fan when the vent is in the open position.

Example 11 can include, or can optionally be combined with the subject matter of one or any combination of Examples 1, 2, 3, 4, 5, 6, 7, 8, 9 or 10 to optionally include wherein the cover leaves a bottom portion of the radiator exposed to permit air to enter the space covered by the cover.

Example 12 can include subject matter (such as an apparatus, a method, a means for performing acts, or a machine readable medium including instructions that, when performed by the machine, that can cause the machine to perform acts), such as can include a method of environmental control in individual spaces of a building, the method comprising: receiving temperature data from one or more temperature sensors located in a space, the space including at least one radiator coupled to a central heating source; automatically adjusting a vent actuator coupled to an insulating cover surrounding the at least one radiator in response to changes in temperature data received from the one or more temperature sensors; and transmitting temperature information to a server configured to control the central heating source; wherein the vent actuator is opened when the temperature data indicates that the space has an ambient temperature below a set point, and the vent actuator is closed when the temperature data indicates that the ambient temperature of the space is above the set point.

Example 13 can include, or can optionally be combined with the subject matter of Example 12, to optionally include wherein a radiator temperature sensor is coupled to the radiator and at least one of the one or more temperature sensors is mounted at a location in the space at a distance away from the radiator to sense the ambient temperature of the space.

Example 14 can include, or can optionally be combined with the subject matter of one or any combination of Examples 12 or 13, to optionally include transmitting information indicative of a position of the vent actuator to the server.

Example 15 can include, or can optionally be combined with the subject matter of one or any combination of Examples 12, 13 or 14, to optionally include adjusting the output of the central heating source based on the temperature information and the actuator information; wherein the output of the central heating source is reduced if the temperature information and actuator information indicate that the ambient temperature of the space is above the set point, and the output of the central heating source is increased if the temperature information and actuator information indicate that the ambient temperature of the space is below the set point.

Example 16 can include, or can optionally be combined with the subject matter of one or any combination of Examples 12, 13, 14 or 15, to optionally include recording, at the server, the temperature information and the actuator information from a plurality of spaces; and reporting variances in the temperature information and the actuator information that indicate one of the plurality of spaces is wasting heat energy.

Example 17 can include, or can optionally be combined with the subject matter of one or any combination of Examples 12, 13, 14, 15 or 16, to optionally include automatically adjusting a fan coupled to an insulating cover surrounding the at least one radiator in response to changes in temperature data received from the one or more temperature sensors.

Example 18 can include subject matter (such as an apparatus, a method, a means for performing acts, or a machine readable medium including instructions that, when performed by the machine, that can cause the machine to perform acts), such as can include a method of controlling environmental conditions in individual spaces of a building, the method comprising: receiving ambient temperature data from one or more ambient temperature sensors located in a plurality of the individual spaces of the building; receiving radiator temperature data from one or more radiator temperature sensors located proximate to a radiator in each of the plurality of the individual spaces; receiving a vent status indication from radiator covers located on the radiator in each of the plurality of the individual spaces; and automatically adjusting an output of a heating source coupled to the radiator in each of the plurality of the individual spaces in response to the ambient temperature data, radiator temperature data, and vent status received from each of the individual spaces of the building.

Example 19 can include, or can optionally be combined with the subject matter of Example 18, to optionally include wherein the output of the heating source is reduced in response to the ambient temperature data, and vent status received from a plurality of the individual spaces of the building indicating that the plurality of the individual spaces of the building have an ambient temperature above a set point and a closed vent status.

Example 20 can include, or can optionally be combined with the subject matter of one or any combination of Examples 18 or 19, to optionally include wherein the output of the heating source is increased in response to the ambient temperature data, and vent status received from a plurality of the individual spaces of the building indicating that the plurality of the individual spaces of the building have an ambient temperature below a set point and an open vent status.

Example 21 can include, or can optionally be combined with the subject matter of one or any combination of Examples 18, 19 or 20, to optionally include receiving outdoor temperature data from at least one temperature sensor located outside of the building; wherein the output of the heating source is adjusted in response to changes in the outdoor temperature data.

Example 22 can include subject matter (such as an apparatus, a method, a means for performing acts, or a machine readable medium including instructions that, when performed by the machine, that can cause the machine to perform acts), such as can include a tangible device-readable medium including instructions that, when performed by the device, control operation of at least a portion of the method of environmental control in individual spaces of a building, the method comprising: receiving temperature data from one or more temperature sensors located in a space, the space including at least one radiator coupled to a central heating source; automatically adjusting a vent actuator coupled to an insulating cover surrounding the at least one radiator in response to changes in temperature data received from the one or more temperature sensors; automatically adjusting a fan coupled to the vent in response to changes in temperature data received from the one or more temperature sensors; and transmitting temperature information to a server configured to control the central heating source; wherein the vent actuator is opened when the temperature data indicates that the space has an ambient temperature below a set point, and the vent actuator is closed when the temperature data indicates that the ambient temperature of the space is above the set point.

Example 23 can include, or can optionally be combined with the subject matter of Example 22, to optionally include adjusting the output of the central heating source based on the temperature information and the actuator information; wherein the output of the central heating source is reduced if the temperature information and actuator information indicate that the ambient temperature of the space is above the set point, and the output of the central heating source is increased if the temperature information and actuator information indicate that the ambient temperature of the space is below the set point.

Example 24 can include subject matter (such as an apparatus, a method, a means for performing acts, or a machine readable medium including instructions that, when performed by the machine, that can cause the machine to perform acts), such as can include a radiator cover, including an insulating material, sized to cover and surround a radiator; a memory shape material configured to respond to a change in an ambient temperature; wherein the memory shape material opens a vent to release heat from the radiator in response to the ambient temperature being below a set point temperature and closes the vent in response to the ambient temperature being above the set point temperature.

Example 25 can include, or can optionally be combined with the subject matter of Example 24, to optionally include the memory shape material including a coupler disposed between the memory shape material and the vent such that a deflection by the memory shape material actuates the vent.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A temperature control system for monitoring temperature, comprising:
    a cover, including an insulating material, sized to cover and surround a steam radiator; and
    at least one controller coupled to the cover, the at least one controller configured to execute computer readable instructions to,
        receive a first temperature measurement from a first temperature sensor, the first temperature measurement corresponding to temperature in a space where the first temperature sensor is positioned,
        determine whether the first temperature measurement is below a first threshold point, and
        output a signal to an actuator if the first temperature measurement is below a first threshold point, the actuator configured to move a vent from a first position to a different second position upon receiving the signal, the first position corresponding to the vent being closed, and the second position corresponding to the vent being open.

2. The temperature control system of claim 1, the cover comprising a foil-faced bubble wrap.

3. The temperature control system of claim 1, the at least one controller comprising a wireless network interface.

4. The temperature control system of claim 3, wherein the at least one controller and the first temperature sensor are coupled via the wireless network interface.

5. The temperature control system of claim 3, wherein the at least one controller is coupled to a mesh network including a plurality of controllers via the wireless network interface, the plurality of controllers are different from the at least one controller.

6. The temperature control system of claim 3, wherein,
    the at least one controller is coupled to a remote server via the wireless network interface, and
    the at least one controller is further configured execute the computer readable instructions to transmit information to the remote server, the information corresponding to the first temperature measurement received from the first temperature sensor.

7. The temperature control system of claim 6, wherein the at least controller is further configured to execute the computer readable instructions to,
    transmit a notification to the remote server when the vent is in the second position and the first temperature measurement is below the first threshold point for a predetermined period of time.

8. The temperature control system of claim 1, comprising a thermo-electric generator, the thermos-electric generator configured to power the at least one controller.

9. The temperature control system of claim 1, comprising a thermo-electric generator, the thermos-electric generator being configured to power the actuator.

10. The temperature control system of claim 1, further comprising,
    a fan coupled to the at least one controller,
    wherein the at least one controller is further configured to execute the computer readable instructions to activate the fan when the vent is in the second position.

11. The temperature control system of claim 1, wherein the cover includes a hollow enclosed structure with an open bottom segment such that air passes through the open bottom segment into the hollow enclosed structure.

12. A method of environmental control in individual spaces of a building, the method comprising:
- receiving a first temperature data from one or more temperature sensors located in a space, the space including at least one radiator coupled to a central heating source;
- receiving a different second temperature data from one or more radiator temperature sensors couple to at least one radiator;
- adjusting an actuator by having at least one controller execute computer readable instructions to output a signal to the actuator based on the first temperature data being below a first threshold point, the actuator and the at least one controller being coupled to a cover surrounding the at least one radiator; and
- transmitting a first information to a remote server configured to control the central heating source, the first information corresponding to the first temperature data received from the one or more temperature sensors;
- wherein the adjusting of the actuator corresponds to moving a vent from a first position to a different second position upon receiving the signal, the first position corresponding to the vent being closed, and the second position corresponding to the vent being open.

13. The method of claim 12, further comprising, a respective radiator temperature sensor of the one or more radiator temperature sensors is coupled to the at least one radiator, and
- at least one of the one or more temperature sensors being mounted at a location in the space at a distance away from the at least one radiator, the at least one of the one or more temperature sensors being configured to measure the ambient temperature of the space.

14. The method of claim 12, further comprising:
- transmitting a second information to the server, the second information corresponding to the first position or the second position of the vent.

15. The method of claim 14, comprising:
- adjusting the output of the central heating source based on the first information and the second information;
- wherein,
  - the output of the central heating source is reduced if the first information and second information indicate that the ambient temperature of the space is above the first threshold point, and
  - the output of the central heating source is increased if the first information and second information indicate that the ambient temperature of the space is below the first threshold point.

16. The method of claim 12, comprising:
- recording, at the server, the first information and the second information from a plurality of spaces; and
- reporting variances in the first information and the second information, the variances indicate one of the plurality of spaces is wasting heat energy.

17. The method of claim 12, further comprising:
- adjusting a fan coupled to the cover surrounding the at least one radiator in response to changes in the first temperature data received from the one or more temperature sensors.

18. A method of controlling environmental conditions in individual spaces of a building, the method comprising:
- receiving ambient temperature data from one or more ambient temperature sensors located in a plurality of the individual spaces of the building;
- receiving radiator temperature data from one or more radiator temperature sensors located proximate to a radiator in each of the plurality of the individual spaces;
- receiving a vent open or closed status indication, the vent formed in the radiator cover enclosing the radiator in each of the plurality of the individual spaces; and
- adjust the vent by having at least one controller execute computer readable instructions to output a signal to an actuator based on the ambient temperature data being below a first threshold point, the actuator configured to control configuration of the vent between open and close, and vent status received from each of the individual spaces of the building.

19. The method of claim 18, wherein the output of the heat is reduced in response to the ambient temperature data, and vent status received from a plurality of the individual spaces of the building indicating that the plurality of the individual spaces of the building have an ambient temperature above the first threshold point and a closed vent status.

20. The method of claim 18, wherein the output of the heating source is increased in response to the ambient temperature data, and vent status received from a plurality of the individual spaces of the building indicating that the plurality of the individual spaces of the building have an ambient temperature below a set point and an open vent status.

21. The method of claim 18, further comprising: receiving outdoor temperature data from at least one temperature sensor located outside of the building; wherein the output of the heating source is adjusted in response to changes in the outdoor temperature data.

22. A method of environmental control in individual spaces of a building, the method comprising:
- receiving temperature data from one or more temperature sensors located in a space, the space including at least one radiator coupled to a central heating source;
- adjusting a vent actuator coupled to an insulating cover surrounding the at least one stream radiator in response to changes in temperature data received from the one or more temperature sensors, the adjusting of the vent actuator by having at least one controller execute computer readable instructions to the vent actuator based on the temperature data being below a first threshold point;
- adjusting a fan coupled to the vent in response to changes in temperature data received from the one or more temperature sensors; and transmitting temperature information to a server configured to control the central heating source;
- wherein the vent actuator is opened when the temperature data indicates that the space has an ambient temperature below the first threshold point, and the vent actuator is closed when the temperature data indicates that the ambient temperature of the space is above the set point.

23. The method of claim 22, further comprising:
- adjusting the output of the central heating source based on the temperature information and the actuator information;
- wherein the output of the central heating source is reduced if the temperature information and actuator information indicate that the ambient temperature of the space is above the first threshold point, and the output of the central heating source is increased if the temperature information and actuator information indicate that the ambient temperature of the space is below the first threshold point.

24. A temperature control apparatus comprising:
- a cover, including a high thermal resistance insulating material, sized to cover and surround a steam radiator and an adjustable vent;
- a fan disposed inside the cover and configured to blow air to a space outside the apparatus;
- one or more temperature sensors disposed inside or outside the cover; and
- at least one controller operatively engaged to the fan and the adjustable vent, in communication with the one or more temperature sensors, the controller being configured to execute computer readable instructions to operate the fan and actuate open and closing of the adjustable vent based on the one or more sensors determining a set point temperature.

25. The temperature control apparatus of claim 24, wherein the one or more temperature sensors includes a temperature sensor configured to measure an ambient temperature of the space or a measure temperature at the radiator.

26. The temperature control apparatus of claim 24, wherein the at least one controller is further configured to execute the computer readable instructions to output a signal to the fan such that air is blown from outside the cover to inside the cover.

* * * * *